(12) United States Patent
Greig et al.

(10) Patent No.: US 9,197,010 B2
(45) Date of Patent: Nov. 24, 2015

(54) MAGNETIC CONNECTOR APPARATUS

(76) Inventors: Nigel Greig, New Market (NZ); William James Sim, New Market (NZ); Edward Scholten, New Market (NZ); Brendon David Midgley, New Market (NZ); Roy Moody, New Market (NZ)

( * ) Notice: Subject to any disclaimer, the term of this patent is extended or adjusted under 35 U.S.C. 154(b) by 0 days.

(21) Appl. No.: 13/337,117

(22) Filed: Dec. 24, 2011

(65) Prior Publication Data

US 2012/0315771 A1    Dec. 13, 2012

Related U.S. Application Data

(60) Provisional application No. 61/429,283, filed on Jan. 3, 2011.

(30) Foreign Application Priority Data

Dec. 24, 2010  (NZ) ........................................ 590246
Jun. 29, 2011  (NZ) ........................................ 593807

(51) Int. Cl.
| | |
|---|---|
| *H01R 11/30* | (2006.01) |
| *H01R 13/62* | (2006.01) |
| *H01R 27/00* | (2006.01) |
| *B64D 11/06* | (2006.01) |
| *H01R 13/703* | (2006.01) |

(52) U.S. Cl.
CPC ........ *H01R 13/6205* (2013.01); *B64D 11/0624* (2014.12); *H01R 27/00* (2013.01); *H01R 13/7037* (2013.01)

(58) Field of Classification Search
USPC ............................................ 439/38, 39, 950
See application file for complete search history.

(56) References Cited

U.S. PATENT DOCUMENTS

| | | | | |
|---|---|---|---|---|
| 3,786,391 | A | * | 1/1974 | Mathauser ...................... 439/39 |
| 4,038,625 | A | * | 7/1977 | Tompkins et al. .............. 336/83 |
| 4,619,495 | A | | 10/1986 | Sochor |
| 4,844,582 | A | | 7/1989 | Giannini |
| 4,874,316 | A | | 10/1989 | Kamon et al. |
| 5,015,061 | A | | 5/1991 | Giannini |
| 5,784,511 | A | | 7/1998 | Kikuchi et al. |
| 5,816,825 | A | | 10/1998 | Sekimori et al. |
| 6,616,468 | B2 | | 9/2003 | Sakiyama |
| 7,311,526 | B2 | | 12/2007 | Rohrbach et al. |
| 7,329,128 | B1 | | 2/2008 | Awad |
| 7,331,793 | B2 | | 2/2008 | Hernandez et al. |
| 7,344,387 | B2 | | 3/2008 | Shiroyama |
| 7,351,066 | B2 | | 4/2008 | DiFonzo et al. |
| 7,497,693 | B1 | | 3/2009 | Wu |
| 7,517,222 | B2 | | 4/2009 | Rohrbach et al. |

(Continued)

FOREIGN PATENT DOCUMENTS

| | | |
|---|---|---|
| DE | 202004 020179 U1 | 3/2005 |
| EP | 1198036 A1 | 4/2002 |

OTHER PUBLICATIONS

Office Action for Application No. 11 195 695.9-1801 from the EPO May 11, 2014, (7 pages).

*Primary Examiner* — Thanh Tam Le

(57) ABSTRACT

A magnetic electrical connector is provided which has particular application to use in vehicles or aircraft to prevent damage due to passenger movement. The connector includes a socket having a housing with a front face, a plurality of conductor contact regions provided on the front face, and a magnet provided in the housing to physically retain a plug in connection with the socket in use.

11 Claims, 21 Drawing Sheets

(56) References Cited

U.S. PATENT DOCUMENTS

| | | |
|---|---|---|
| 7,625,212 B2 * | 12/2009 | Du ................................. 439/39 |
| 7,637,746 B2 | 12/2009 | Lindberg et al. |
| 7,641,477 B2 | 1/2010 | DiFonzo et al. |
| 7,645,143 B2 | 1/2010 | Rohrbach et al. |
| 7,762,817 B2 | 7/2010 | Ligtenberg et al. |
| 7,775,801 B2 | 8/2010 | Shiff et al. |
| 7,901,216 B2 | 3/2011 | Rohrbach et al. |
| 7,997,906 B2 | 8/2011 | Ligtenberg et al. |
| 8,348,678 B2 * | 1/2013 | Hardisty et al. ............ 439/39 |
| 2004/0209489 A1 | 10/2004 | Clapper |
| 2007/0072443 A1 | 3/2007 | Rohrbach |
| 2007/0254510 A1 | 11/2007 | DeBey |
| 2008/0188137 A1 | 8/2008 | Goetz |
| 2008/0232061 A1 | 9/2008 | Wang |
| 2008/0311765 A1 | 12/2008 | Chatterjee |
| 2009/0117783 A1 | 5/2009 | Wu |
| 2009/0174990 A1 | 7/2009 | Ligtenberg et al. |
| 2010/0254111 A1 | 10/2010 | Ligtenberg et al. |
| 2011/0189863 A1 | 8/2011 | Sare |
| 2012/0122332 A1 | 5/2012 | Zhu |
| 2012/0178270 A1 * | 7/2012 | McElroy et al. ............ 439/39 |
| 2013/0244492 A1 | 9/2013 | Golko et al. |

* cited by examiner

MAGNETIC CONNECTOR APPARATUS

BACKGROUND OF THE INVENTION

1. Field of the Invention

This invention relates to connector apparatus. The invention is directed particularly, but not solely, to connector apparatus for making electrical connection between a media source and media delivery equipment, for example, an audio signal connection between apparatus such as a headset and an audio signal source such as that provided by an in-flight entertainment system.

2. Background

Conventional connectors typically comprise a socket, and a plug which is received in the socket. For example, in an airline cabin, an in-flight entertainment system may provide media such as audio and video information to passenger seat locations, so that it is available to passengers. The video information is typically made available via a visual display unit located on the rear of a seat immediately in front of the passenger. Audio information is typically provided via a connector socket (sometimes referred to as a jack) which is provided adjacent to the seat, for example, being provided in the arm rest. The user is typically provided with a headset which has a plug which is received in the socket, so that the audio information is delivered to the headset.

A problem can occur when tension is applied the headset plug. If the tension is applied in a direction so as to pull the plug axially from the socket, then no damage will usually occur. However, if tension is supplied in a direction other than the axial direction, such as a perpendicular direction, then breakage may occur. This is because the plug typically includes one or more elongate pins which are received in the socket. Unless the plug pins are removed in an axial direction, then there is a risk that the plug pins can break. This is often a problem within aircraft cabins, since a headset, or headset cable, can frequently be moved unintentionally. One example is a situation in which a passenger forgets that the headset is still being worn and rises from his or her seat, causing the headset cable to violently pull the plug from the socket. Another example is when an object is being moved in the vicinity of the seat, for example, a pillow or food tray which may catch on the headset cable, causing the plug to be torn from the socket.

OBJECT OF THE INVENTION

It is an object of the present invention to provide an approved connector apparatus, or to at least provide connector apparatus which provides a useful alternative to known connector apparatus or systems.

SUMMARY OF THE INVENTION

Figure 1:
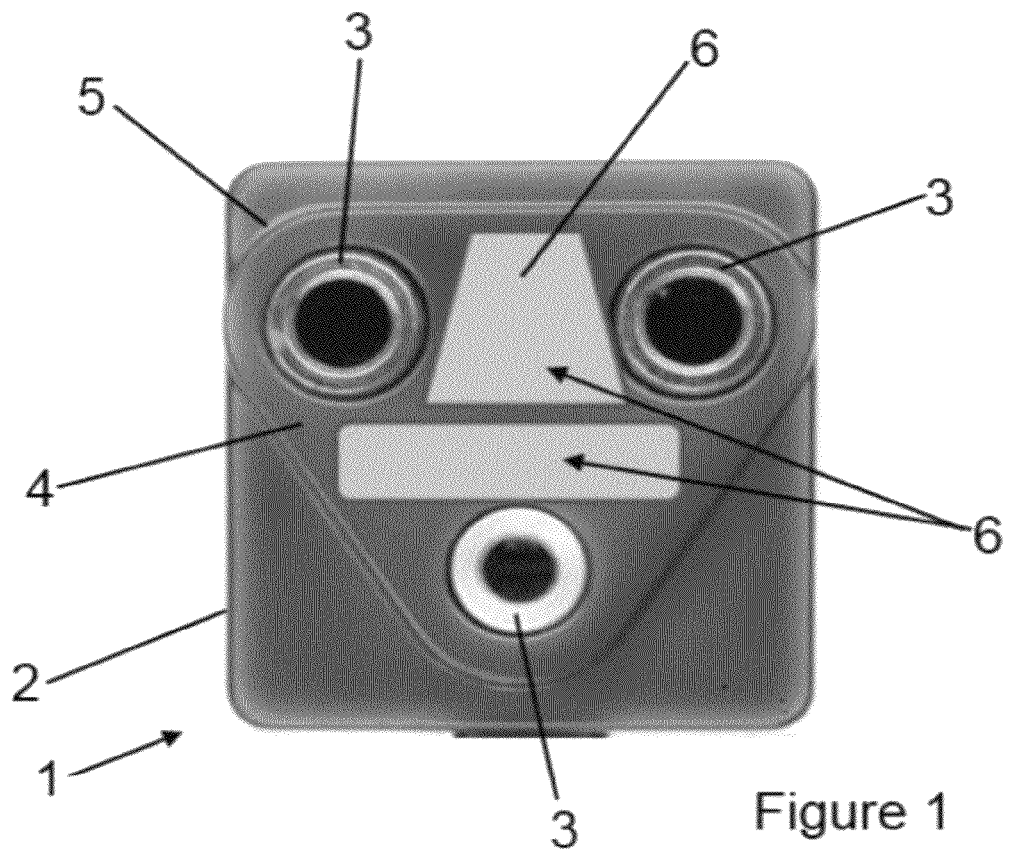
FIG. 1 is a front elevation of a jack or a socket in accordance with one embodiment of the invention.

In one aspect the invention provides an electrical connector socket comprising:
 a housing having a front face, a plurality of conductor contact regions provided on the front face, and
 a magnet provided in the housing to physically retain a plug in connection with the socket in use.

Preferably the conductor contact regions are substantially flush with the front face.

Preferably the conductor contact regions are formed from a layer of conductive material.

Preferably the conductor contact regions are adjacent to each other and in the same plane.

Preferably the socket includes a plug pin receiver.

Preferably the socket may be electrically connected to a plug via the conductor contact regions or via the plug pin receiver.

Preferably one or more of the conductor contact regions is a power contact region operable to make a power supply available to a plug.

Preferably the power contact region is operated to make power available to the plug once the plug has been connected to the socket.

Preferably the housing comprises an alignment contour to co-act with a contour of a plug to facilitate correct alignment of the plug with the socket.

Preferably the alignment contour comprises a plug pin receiver.

Preferably the conductor contact regions are provided in three rows.

Preferably the rows are parallel with each other, the contact regions in the first and third rows are substantially aligned and the contact regions of the second row are offset with respect to those of the first and third rows.

In another aspect, the invention provides connector apparatus comprising:
 a plug having a plurality of conductor contact regions for contacting conductors provided on a socket or receiver; and
 a magnetic means provided rearwardly of one or more of the contact regions to co-act with a magnetic means associated with the socket or receiver.

Preferably the magnetic means is provided such that in use at least one of the conductor regions is disposed between the magnetic means and the plug.

Preferably the contact regions are provided in a layer.

Preferably the contact regions are defined by one or more insulating layers.

Preferably the apparatus includes an alignment contour to facilitate correct alignment of the plug with a socket.

Preferably the alignment contour comprises a projection or recess for alignment with a corresponding projection or recess on the socket.

Preferably the projection or recess corresponds with a projection or recess on an existing audio jack.

In another aspect the invention provides connector apparatus comprising: a socket or receiver having plurality of conductor contact regions for contacting conductors provided on a plug; and magnetic means provided rearwardly of one or more of the contact regions to co-act with a magnetic means associated with a plug.

Preferably the magnetic means is provided as such that in use at least one of the conductor regions is disposed between the magnetic means and the socket.

Preferably the contact regions are provided in a layer.

Preferably the contact regions are defined by one or more insulating layers.

Alternatively one or more of the contact regions comprises a spring contact.

Preferably the apparatus includes an alignment contour to facilitate correct alignment of the socket with the plug.

Preferably the alignment contour comprises a projection or recess aligned with the corresponding projection or recess on the plug.

In a further aspect the invention provides connector apparatus comprising:
 a plug and/or a socket having a plurality of conductor contact regions, the contact regions being formed from a conductive layer provided on the housing of the plug or socket.

Preferably a physical dimension of the contact regions is defined using one or more insulating layers.

In a further aspect the invention provides connector apparatus comprising a socket including at least one electrode for providing a power supply to conductors or electrodes of a plug to be adapted for use with the socket, wherein the power supply is only made available to the electrodes once the plug is connected to the socket.

In yet a further aspect the invention provides connector apparatus comprising:
 a socket for receiving one or more pins of a plug adapted for connection with the socket, the socket also including a plurality of conductor contact regions for contacting conductors provided on the plug; and
 a magnetic means for co-acting with a magnetic means provided on a plug.

Preferably the conductor regions are electrically connected to appropriate pin receiving sockets on the socket assembly such that the socket may be operatively connected to equipment having either a plug with one or more pins, or a plug having a plurality of contact regions. In a further aspect the invention broadly provides connector apparatus comprising a plug having a magnet means and a plurality of contact regions, at least one of the contact regions comprising a spring contact.

Preferably the magnet means is provided rearwardly of the contact regions.

In another aspect the invention broadly provides a pin arrangement for a magnetic connector having three rows of electrical contact pins.

Preferably the rows are provided one above another.

Preferably the pins in the first and third rows are aligned, and the pins of the second row are offset with respect to those of the first and third rows.

In another aspect the invention broadly provides an electrical contact arrangement for a magnetic connector having three rows of electrical contact regions.

Preferably the rows are provided one above another.

Preferably the contact regions in the first and third rows are aligned, and the contact regions of the second row are offset with respect to those of the first and third rows.

In one embodiment the conductor contact regions are form on a printed circuit board. Preferably the printed circuit board is formed such that the contact regions protrude therefrom. Preferably the contact regions are flush with the housing face surrounding them.

In a further aspect the invention provides magnetic connector apparatus comprising a plug and a receiver to which the plugs may be connected, the plug and receiver being capable of alignment in only one orientation.

In a further aspect the invention provides connector apparatus comprising a socket, receiver or plug having an arrangement of contacts or contact regions substantially as shown in any one of FIGS. 2, 5, 6, 8, 11, 12, 20 of the accompanying drawings.

Further aspects of the invention will become apparent from the following description.

DETAILED DESCRIPTION OF THE EMBODIMENTS

Those skilled in the art will appreciate that the words "socket" or "jack", and "plug" are used for the purposes of convenience, since the connection apparatus and system described in this document comprises components which may not conform to the traditional definition of a socket, jack or plug. Instead, the terms "socket" and "jack" are used to refer generally to a connector component which is connected to a communication system or a media delivery device or system for example, and the term "plug" is used to refer to a connector component which is typically attached to a device used by a user, such as a headset for example.

Although the embodiments discussed below are referred in the context of audio delivery apparatus such as headsets and noise canceling headphones, the invention is not intended to be limited to that application. Therefore, it should be appreciated that the invention is applicable to connector apparatus in general, and includes within its scope connector apparatus for use in communication systems such as "SKYPE" headsets and/or mobile telephone connection devices and/or MP3 media delivery device charging interfaces or connectors amongst other various applications.

Referring to FIG. 1, a socket is shown generally referenced 1. The front elevation shown in the drawing reveals the front face of the socket as it would appear ready to receive a "plug" of a connector. Those skilled in the art will appreciate that the socket construction as shown in FIG. 1 is an example of an existing socket which may be used in conjunction with a noise canceling headset. Therefore, the socket as shown in FIG. 1 is one which can be used with an existing form of plug, i.e. being capable of receiving one, two, or up to three pins of an existing plug construction, but which is also adapted to receive an alternative form of plug which is held in place by virtue of magnetic means which act between the socket and the plug, as will be described further below. Those skilled in the art will appreciate that the invention as described below may also be implemented in a socket and/or plug construction which does not provide the existing conventional plug pin and plug pin receiver construction.

Therefore, referring still to FIG. 1, the socket 1 includes a housing 2 which supports three pin receiving sockets 3. The housing has a face 4. In the embodiment shown, face 4 comprises part of a contour in the housing defined by raised edge 5 which may be used to facilitate correct interconnection between the socket and the plug, as will be described further below.

Located behind face 4 of the plug (i.e. within the housing) is a magnetic means comprising one or more magnets 6 which are diagrammatically represented in FIG. 1 for purposes of explanation despite not normally being visible. Those skilled in the art will appreciate that only a single magnet need be provided in some embodiments, and that more than two magnets can be provided in other embodiments. It will also be appreciated that magnets can be provided in different positions, other than those shown. Magnetism may be conducted through metal contacts to facilitate magnetic fields suiting connection to the plug whilst minimizing the of volume socket. Furthermore, those skilled in the art will appreciate that, rather than being magnetized, the material which is used may simply be a magnetically permeable material i.e. a material which facilitates a magnetic attraction with a magnet or magnetized material provided in a plug, for example. Alternatively, magnetic means 6 may comprise magnets which act on magnetically permeable material (rather than a magnet per se) which is provided in or on a plug adapted for connection with the socket 1.

Figure 2:
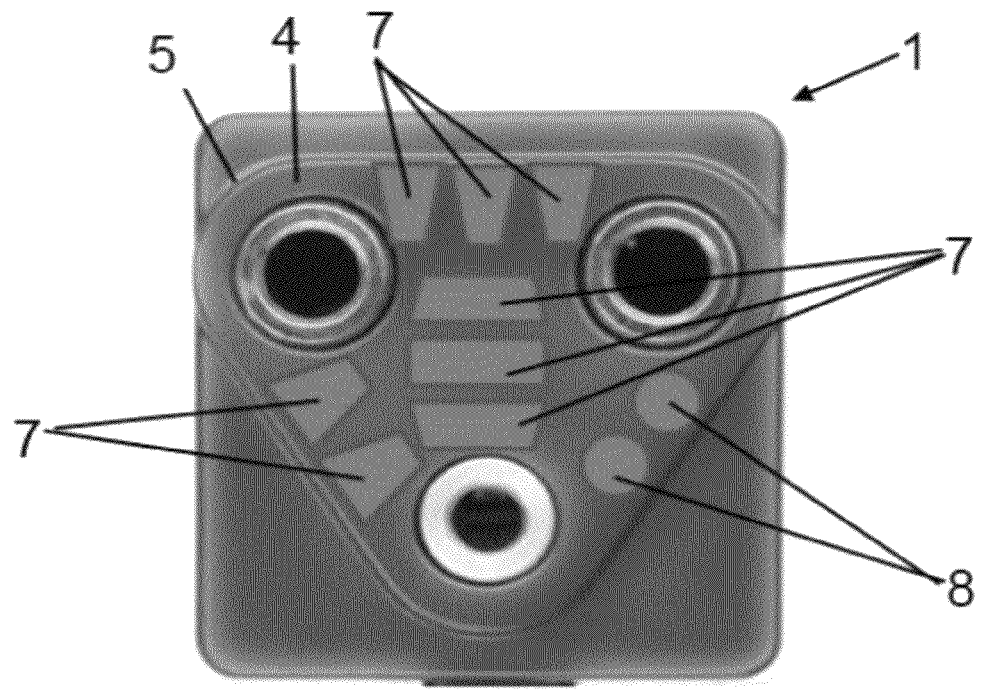
FIG. 2 is a further front elevation of the jack of FIG. 1.

Referring now to FIG. 2, the socket of FIG. 1 is again illustrated, but this time showing contact (i.e. electrical conductor or terminal) regions on face 4. Conductor contact regions 7 are in this embodiment provided to allow the required number of contacts to adequately support a noise canceling headset. Conductor contact regions 8 may provide a power supply for operation of a device such as a noise canceling headset. The contacts 7 and 8 are provided such that they are exposed conductors adapted to make electrical connection with appropriate conductor contacts disposed in similar locations on the plug which is adapted for connection to the socket 1. Therefore the contacts 7 and 8 are provided in front of the magnetic means 6. This is shown more clearly in FIG. 3. Further the contact regions 7 and/or 8 may provide dedicated contacts for connection to telephony (Voice over IP) headsets and other communication equipment.

Figure 3:
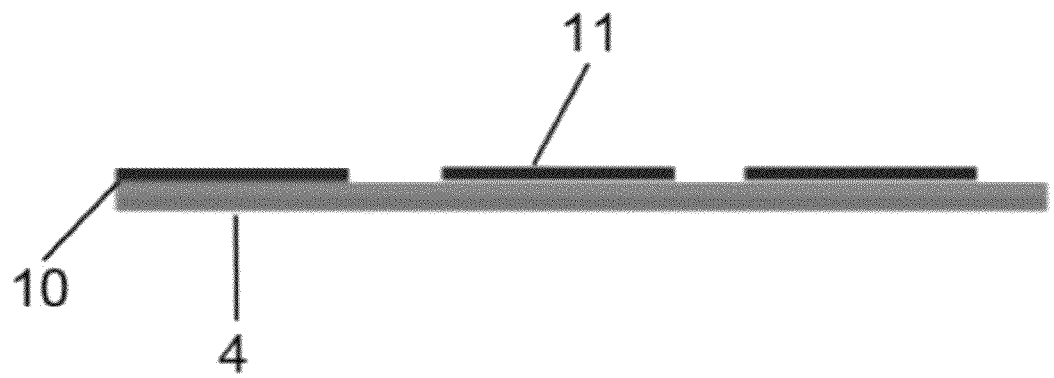
FIG. 3 is a diagrammatic side elevation in cross section of the front face of the jack of FIGS. 1-2.
Figure 4:
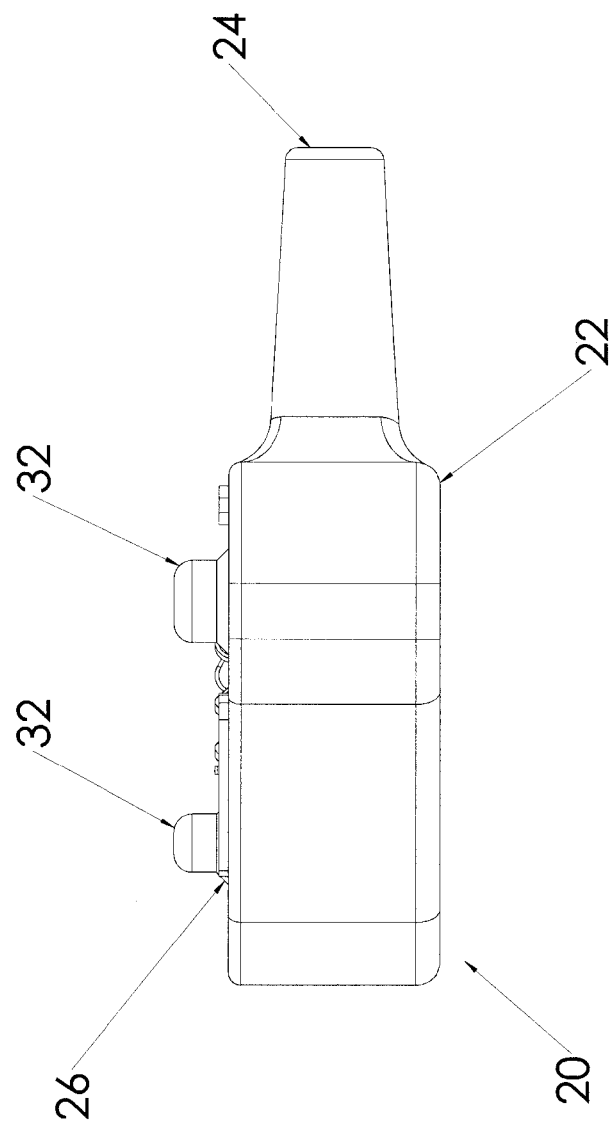
FIGS. 4-7 are a side elevation, perspective view, front elevation and end elevation, respectively, of an embodiment of a plug that may be used with a socket such as that shown in the preceding figures.
Figure 5:
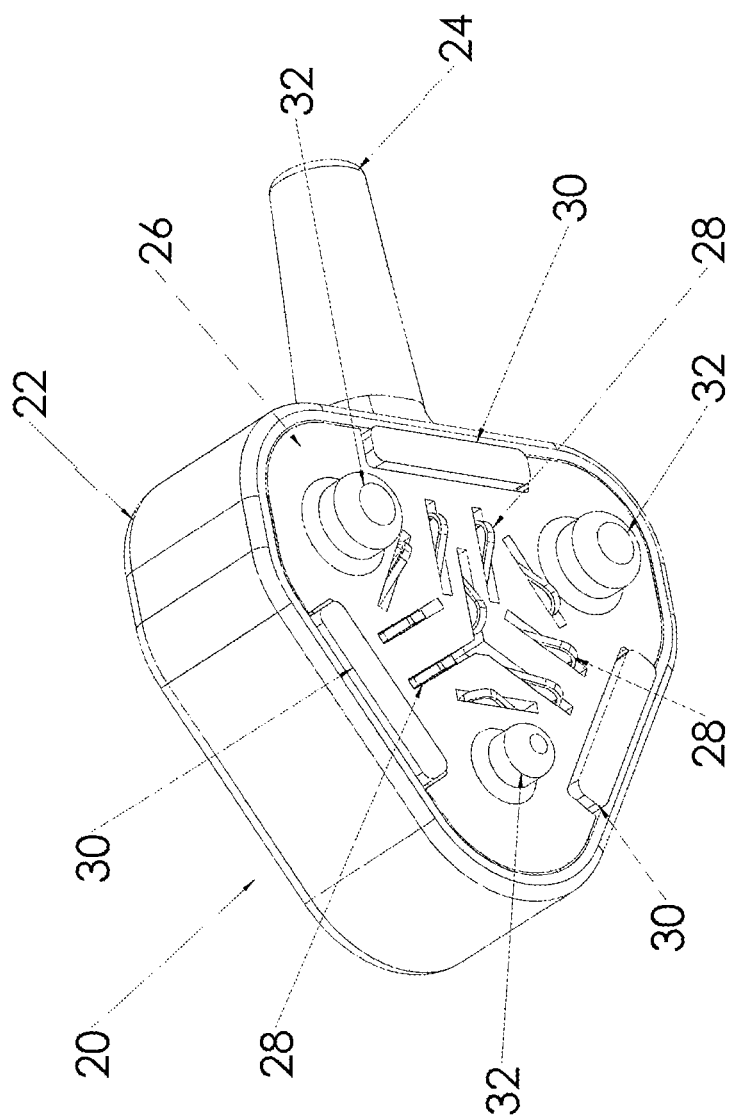
Figure 6:
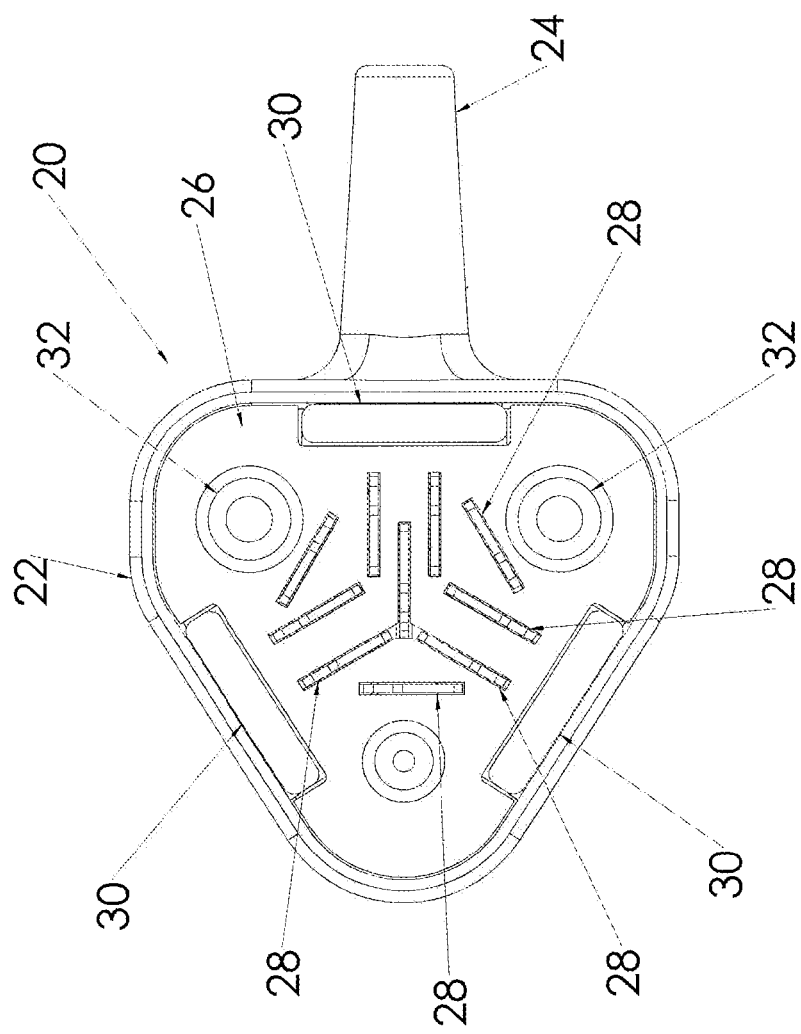
Figure 7:
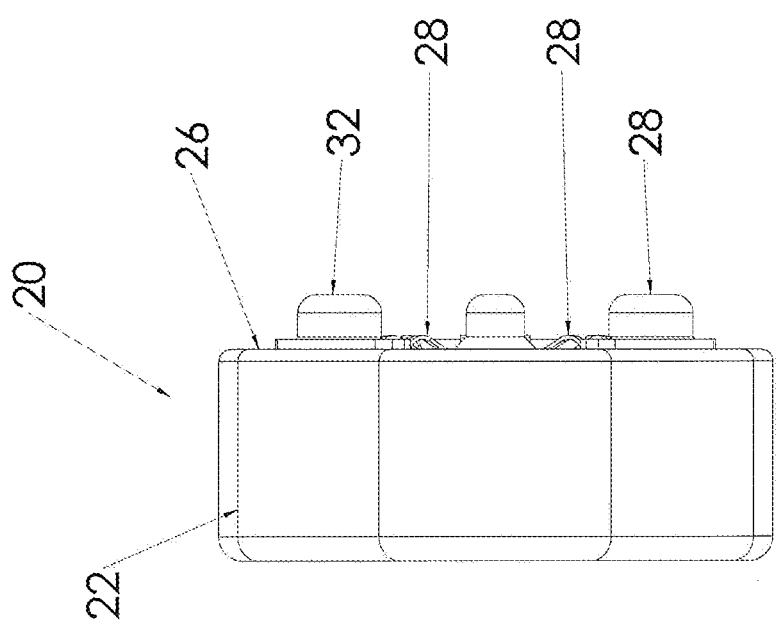

Turning now to FIG. 3, the housing face 4 is shown, and it can be seen that above the housing face 4 a conductive layer 10 is provided. Layer 10 is configured to be connected at its periphery (not shown) or at another convenient location, with the appropriate conductors within the housing 2 for the electrical connections required to enable operation of the socket. This conductive layer 10 is shaped, or has an appropriate insulating region to enable the plurality of contact regions to be provided. The physical dimensions or extent of contact areas 7 and 8 can be defined by applying a non-conductive (and preferably appropriately cosmetic) layer 11 which therefore defines the required shape of each of the contact regions 7 and 8.

Alternatively, rather than the construction shown in FIGS. 2 and 3, those skilled in the art will appreciate that the face 4 may be constructed such that the connector regions project above a surrounding insulated region. For example, the connector regions may comprise spring contacts, as will be described further below with reference to FIGS. 4 to 7. Regarding the power supply contacts 8, in one embodiment, a detector is included in the socket, so that when a plug is correctly connected to the socket, then the power supply is made available to contact regions 8 so that the supply can be used by the plug. Otherwise, the power supply is not available at contact regions 8 for safety purposes. This can be achieved by a mechanical switch for example, or alternatively, by electrically detecting connection of the plug with the socket or by using impedance detection circuitry to detect the nature of the connection made. Thus in one embodiment the contacts 7 may be used to electrically detect the presence of the plug, and in another embodiment the presence of a plug pin within a pin receiver of the socket may be used to perform the detection step. Alternatively, the contact regions 8 may be recessed sufficiently so as to make inadvertent shorting or other electrical contact unlikely.

In one embodiment, the conductive layer 10 and the non-conductive layer 11 may be constructed as "decals" which are easily manufactured and attached to body 2 of a socket 1 during a manufacturing process.

Furthermore, the outer contour of the face 4, as defined by edge 5 may be used to ensure that a correct alignment is achieved between the socket 1 and an appropriate plug. Therefore, the plug (not shown) may include a recess which corresponds with edge 5 to ensure a correct alignment is achieved in use between the socket and the plug. Alternatively or additionally, other alignment contours may be used to ensure that not only is alignment between the socket and plug correct, but also that the orientation of the plug is correct relative to its socket.

Referring now to FIGS. 4 to 7, one embodiment of a plug which may be used with the socket of the preceding figures is illustrated. Referring to those figures, the plug is shown generally referenced 20, having housing 22. The housing includes an opening 24 to allow a lead or cable to be connected to the housing. Although not shown in FIGS. 4 to 7, the housing contains one or more magnetic means such as magnets or magnetically permeable material, as discussed above in relation to the socket 1. In one embodiment, the magnet means is provided rearwardly of contacts 28. The upper surface 26 of the plug 20 includes a number of contacts 28. In this example, the contacts 28 comprise spring contacts i.e. the contacts project beyond surface 26 and are biased outwardly, but capable of being pressed back toward surface 26 on contact with the connector regions of the socket. Those skilled in the art will appreciate that other forms of contact 28 may be provided. the upper surface 26 also includes one or more alignment means which include contours and such as projecting portions and/or stubs 32. In use, the contours 28 can locate about outer surfaces of the peripheral edge 5 of the connector, and the stubs 32 may be provided within the pin receivers 3. Those skilled in the art will appreciate that other arrangements are possible, and that the stubs 32 could also include some form of communication connection (i.e. include one or more conductors) and/or may also include one or more magnetic means.

Figure 8:
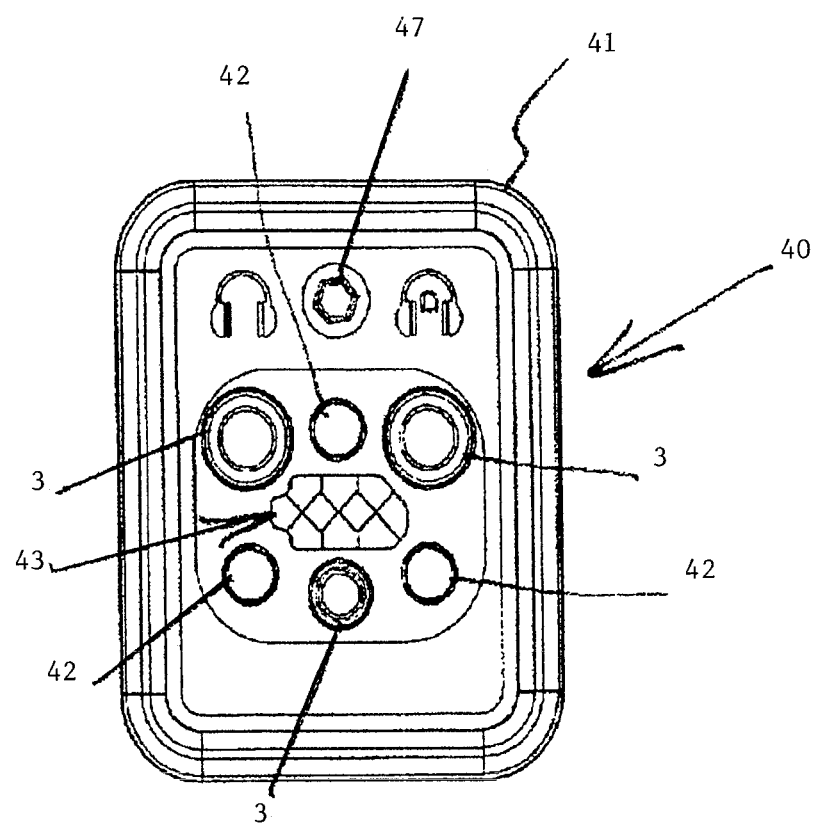
FIGS. 8-10 illustrate a second embodiment of a receiver or a socket according to the invention.
Figure 9:
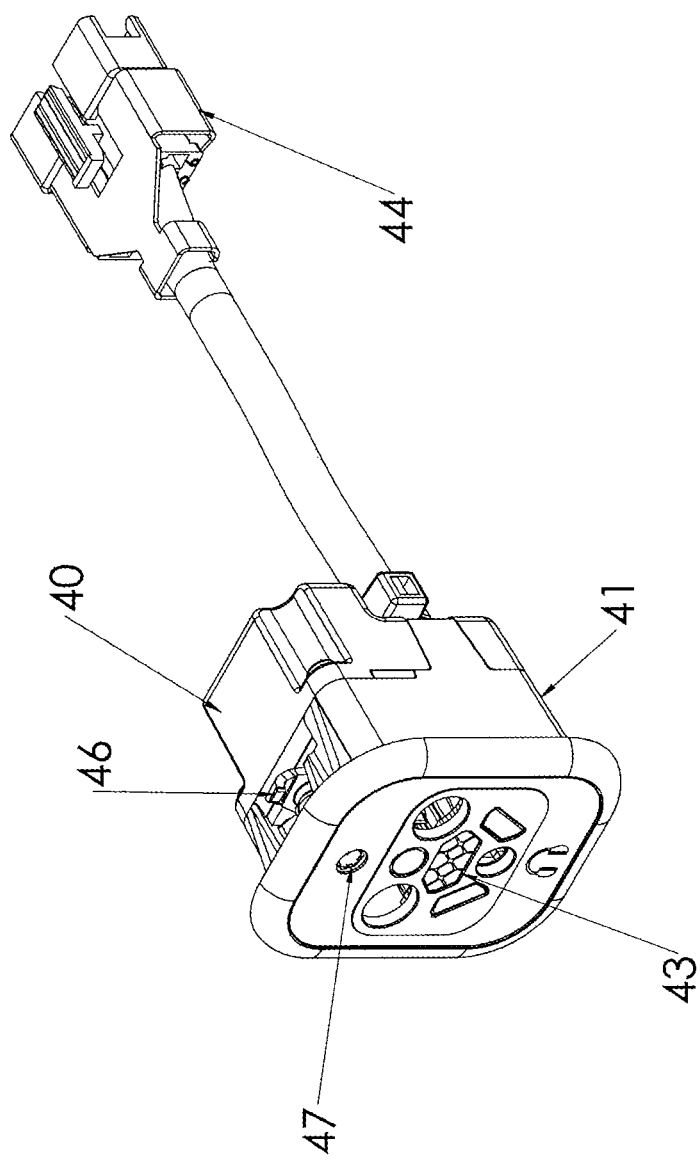
Figure 10:
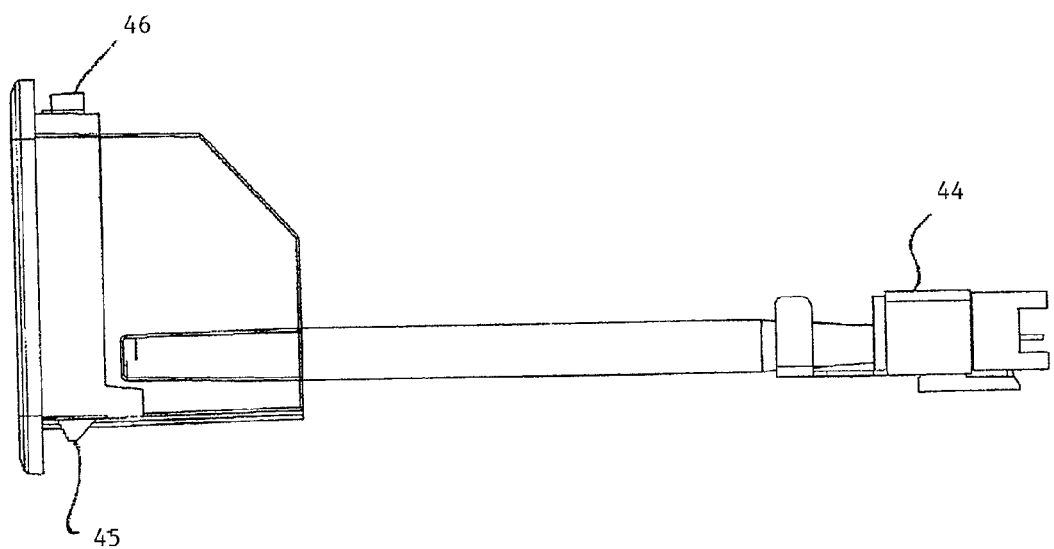

Turning to FIGS. 8 to 10, a second embodiment of a socket is illustrated. Again, the socket may include conventional functionality including pin receivers 3 for receiving pins of one or more known headset plugs. The socket has magnetic areas 42. In a preferred embodiment these comprise permanent magnets (for example rare earth magnets), but in other embodiments may simply be ferromagnetic material for co-acting with a magnet or magnets in similar areas on a plug. The apparatus is generally referenced 40 and has a housing 41. Associated with the housing 41 are locating projections 45 and a controllable location projection 46. The function of these features will be described further below.

Figure 11:
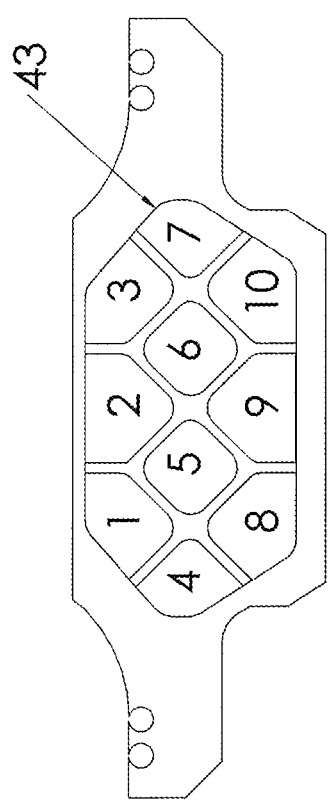
FIG. 11 shows a diagrammatic enlarged view of a plurality of contact regions and the associated electrical function for each region for the socket of FIGS. 8-10.

As can be seen, a plurality of conductor contact regions arranged in a group 43 is provided. These are shown in more detail in FIG. 11. The individual regions are labeled 1 to 10 in that figure and an example of an appropriate function for each electrical contact region in the context of an audio headset is also illustrated in FIG. 11. It can be seen that the individual regions are arranged in three rows, the regions in the first and third rows being substantially aligned with each other, (i.e.

regions 1, 2, 3 and 8, 9, 10) and the second or middle row (i.e. regions 4, 5, 6 and 7) has contact regions that are offset from the first and third rows. Furthermore, it can be seen that the region bounded by the contact regions 43 has a distinctive shape which may be adapted for receiving a part of the plug, as described further below. The shape thus helps to ensure that the plug and the socket can be aligned in only one way and therefore the correct contacts are made between the plug and the socket.

Figure 12:
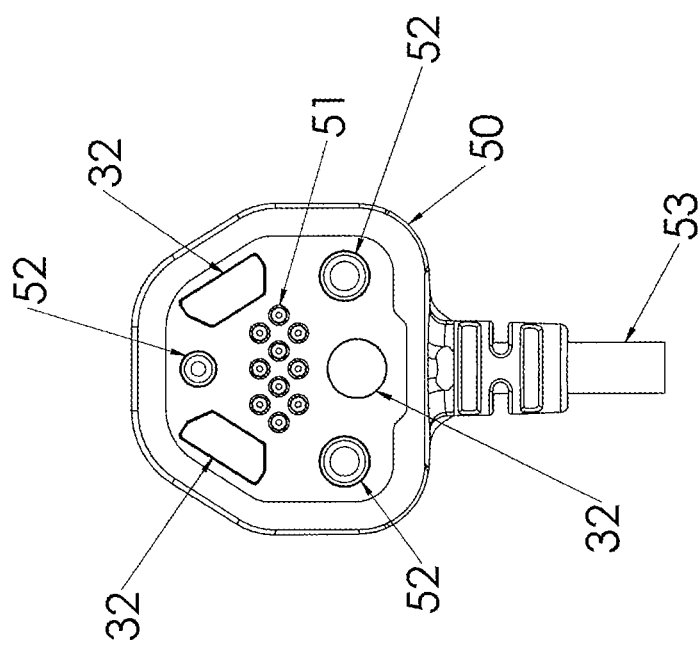
FIGS. 12-14 show a plug for use with the jack of FIGS. 8-10.
Figure 13:
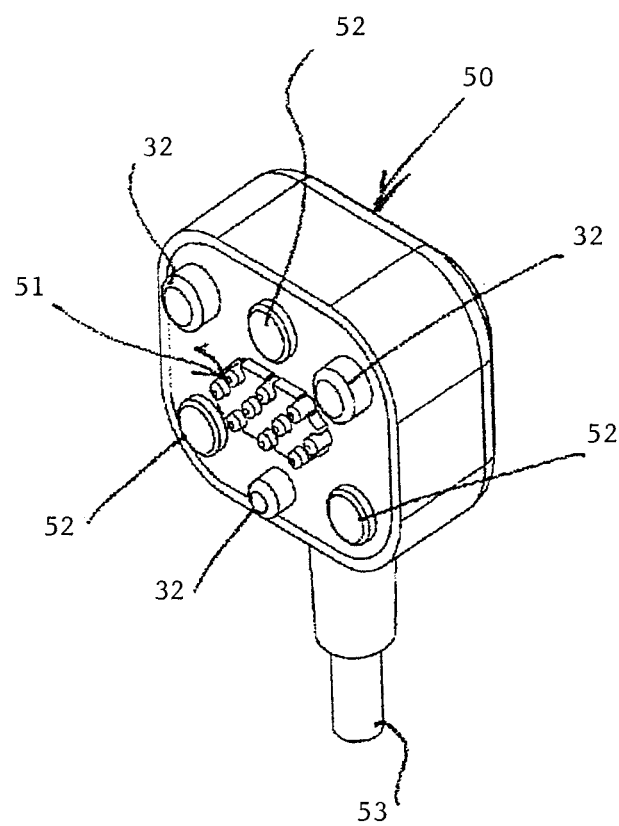
Figure 14:
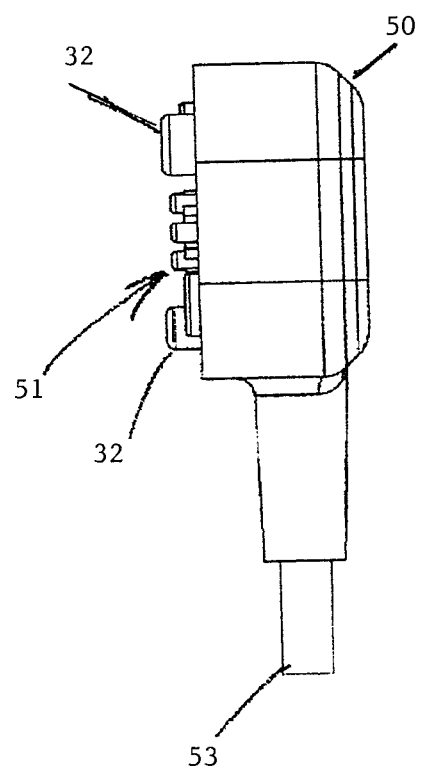

A plug for use with the socket of FIGS. 8 to 10 is shown in FIGS. 12 to 14. As with the previous embodiment, the plug, which is referenced 50, has a cord 53 and has projections 32 if required to assist with alignment with the socket. Magnets or magnetic regions 52 are provided to co-act with the magnets or regions 42 of the socket. A plurality of pins 51 is arranged in appropriate rows as described with reference to the plurality of contact regions 43 of the socket. The array of pins 51 may project slightly as shown in FIG. 13 for reception in an appropriately contoured recess of the socket. The pins 51 may comprise spring contacts which are biased to project but can move axially back toward the body of the plug upon contact with the socket.

Figure 15:
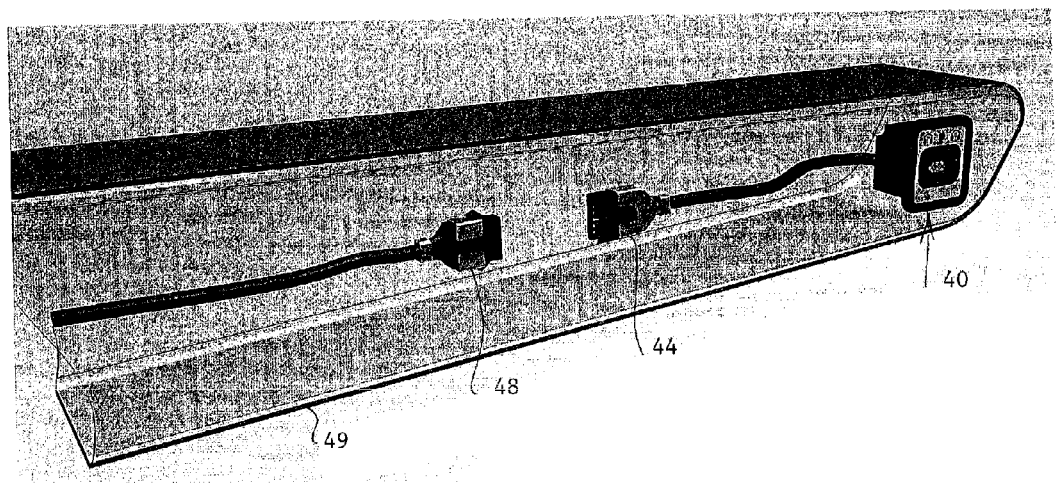
FIG. 15 shows a diagrammatic illustration of the apparatus of the preceding Figures in use in a vehicle arm rest.
Figure 16:
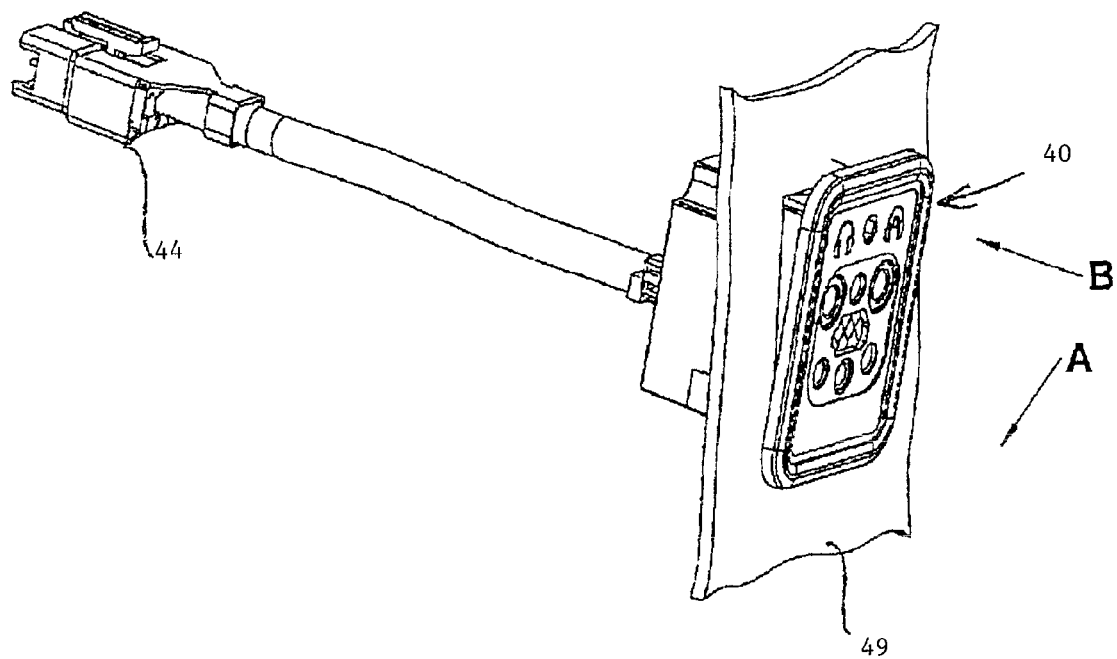
FIGS. 16-19 illustrate an installation process for the socket of FIGS. 8-10.
Figure 17:
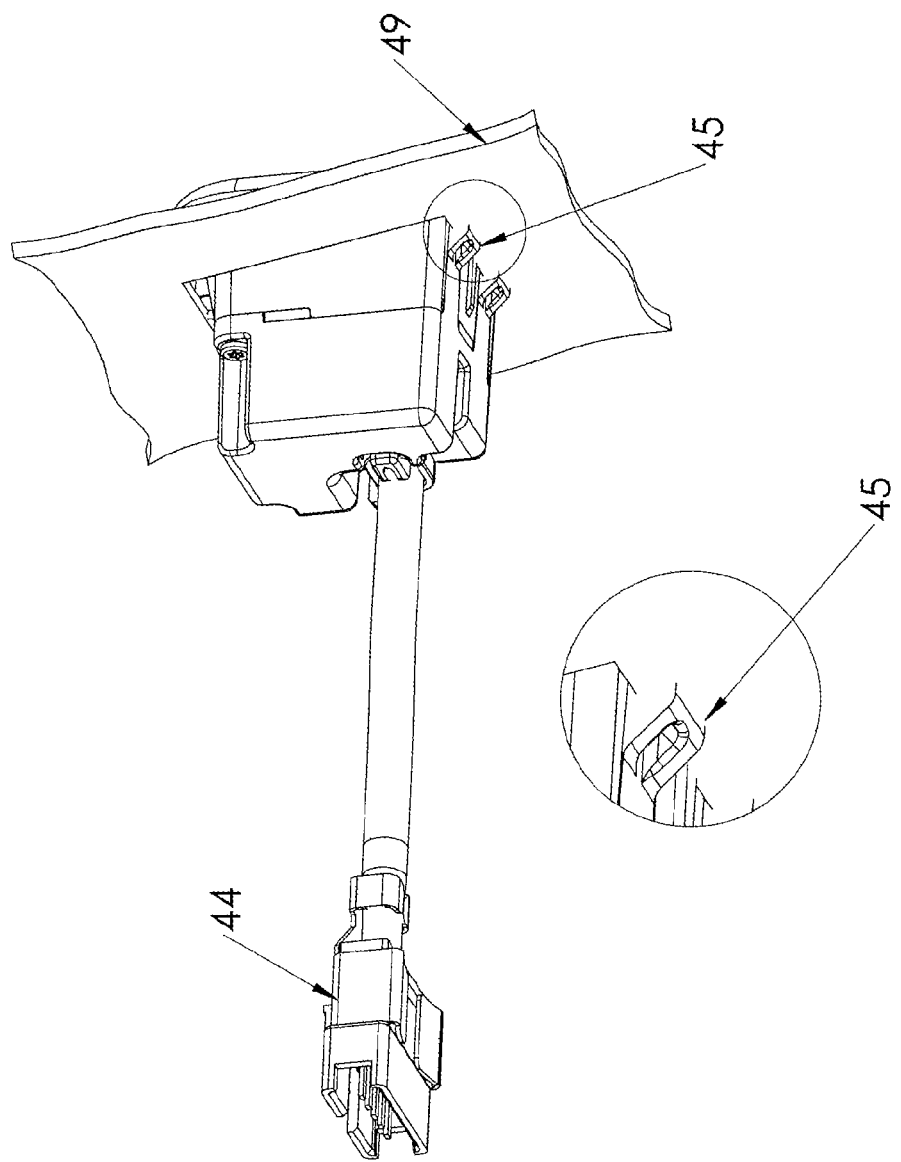
Figure 18:
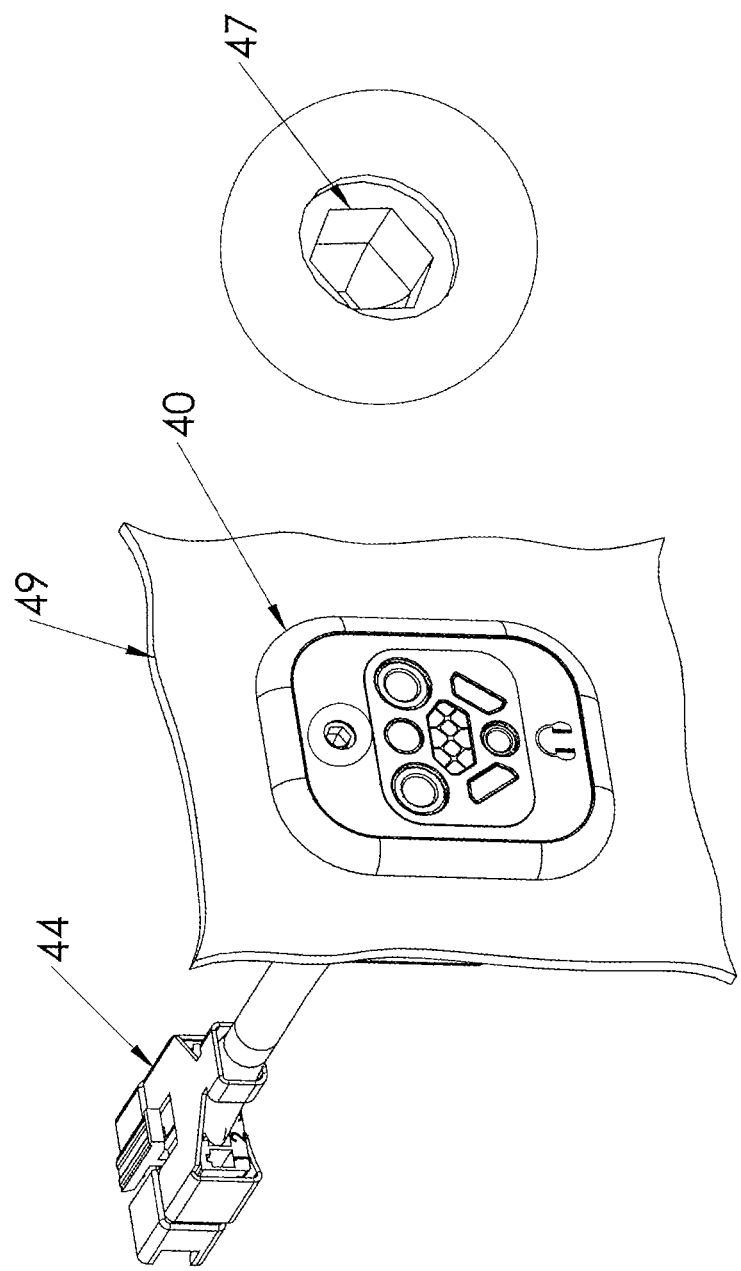

Turning to FIG. 15, an armrest 49 is shown such as an aircraft seat armrest, which may include a connector 48 that forms a part of the aircraft or vehicle IFE system. The socket 40 is engaged in the armrest and the plug 44 may be engaged with the connector 48.

Figure 19:
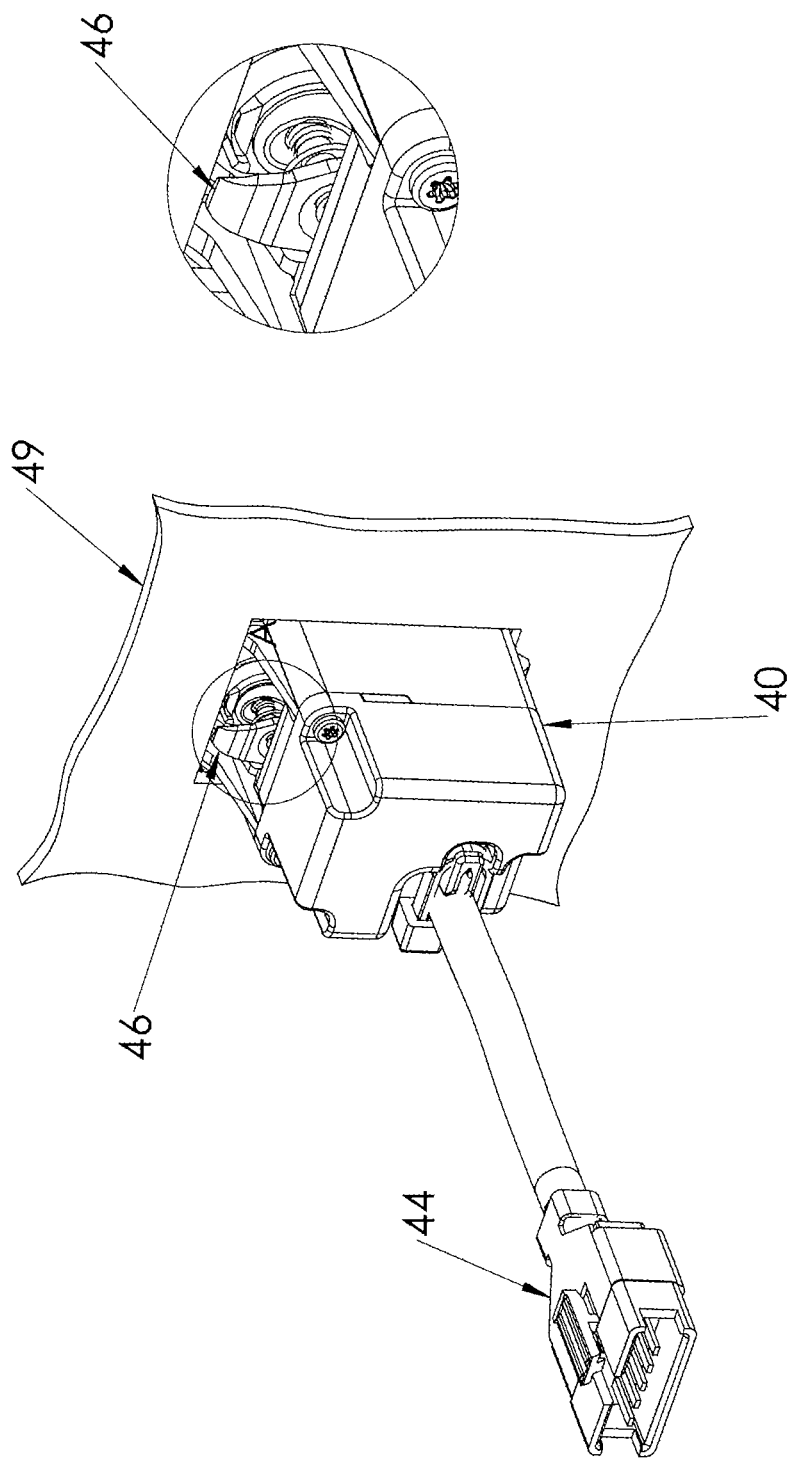

In FIGS. 16 to 19, an installation process for the socket 40 into armrest 49 is illustrated. As can be seen, the location projections 45 engage with the lower part of a cutout in the armrest 49. The projection 46 is lowered by using an Allen Key or other appropriate tool to rotate projection 46 through use of the tool receiving socket 47. Once the socket 40 is in place, the projection 46 is moved so that it projects from the housing and prevents the socket 40 from being removed from the armrest 49, as shown in FIG. 19.

Figure 20:
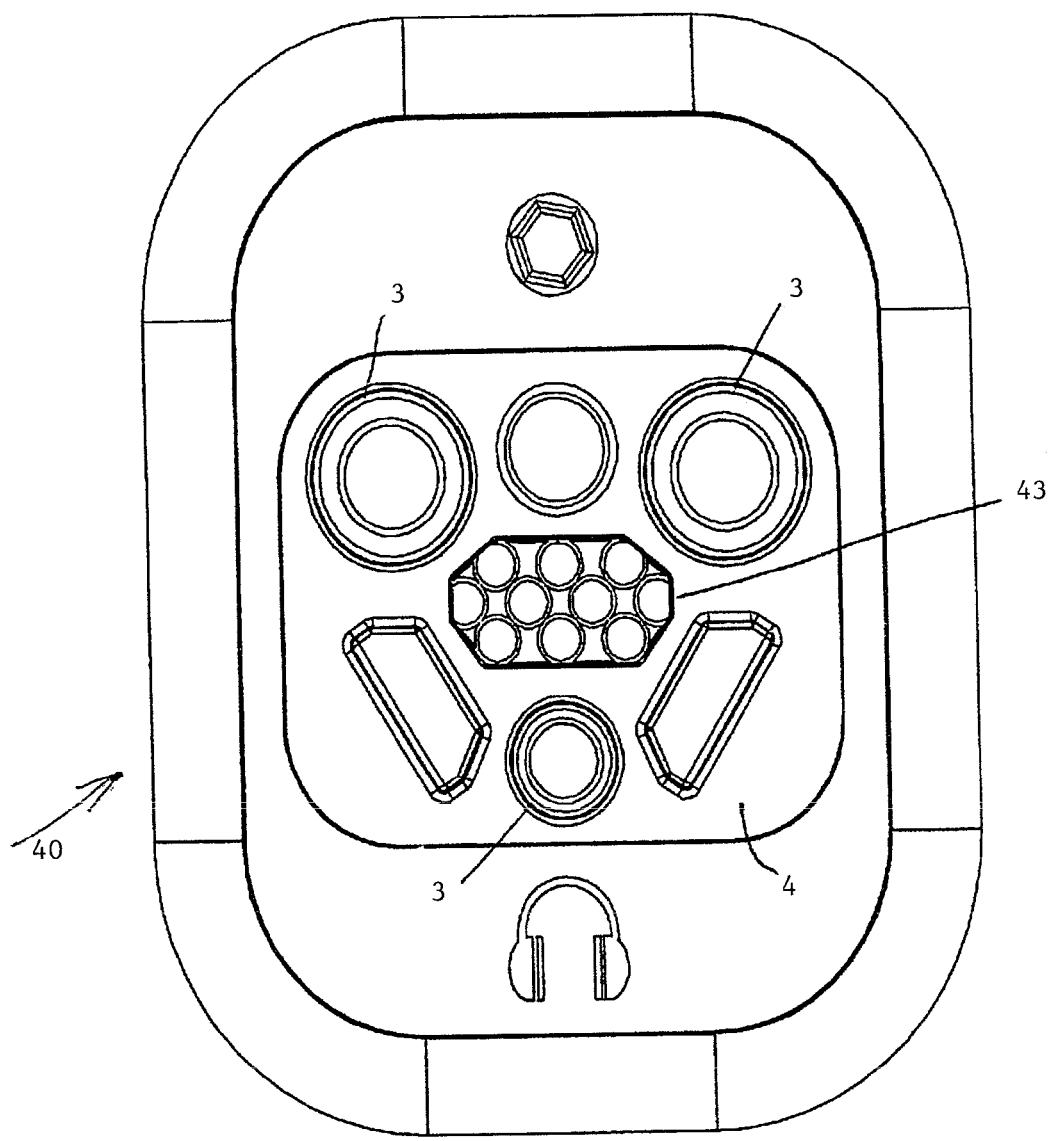
FIG. 20 shows a front elevation of a further embodiment of the invention.

A further embodiment of socket is shown in FIG. 20 in which the group 43 of conductor contact regions is has a different physical form, but comprises three rows of conductor contact regions which are provided adjacent to each other in the same plane. In this embodiment the group 43 is substantially flush with the surrounding portion of face 4 so that there is no lip or ridge about which dirt or grime can accumulate and thus cause a malfunction.

Figure 21:
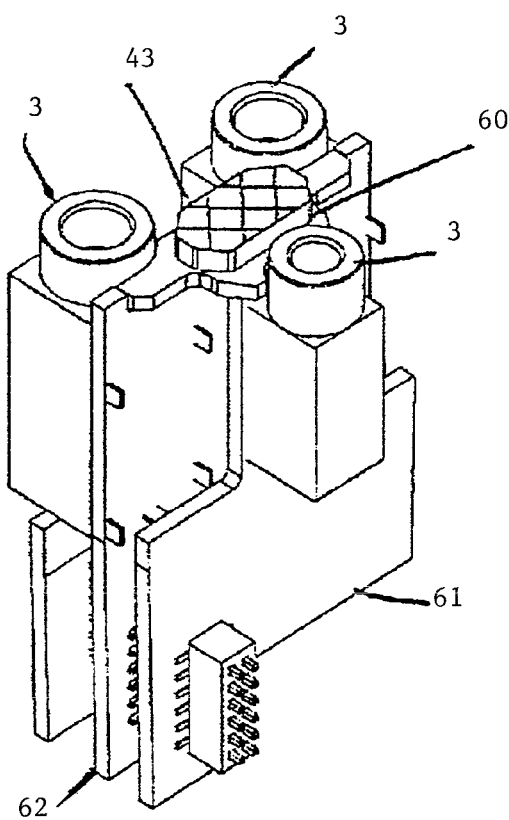
FIGS. 21-22 are isometric views of a printed circuit board arrangement on which plug pin receivers and conductor contacts are provided for the embodiment of FIG. 20.
Figure 22:
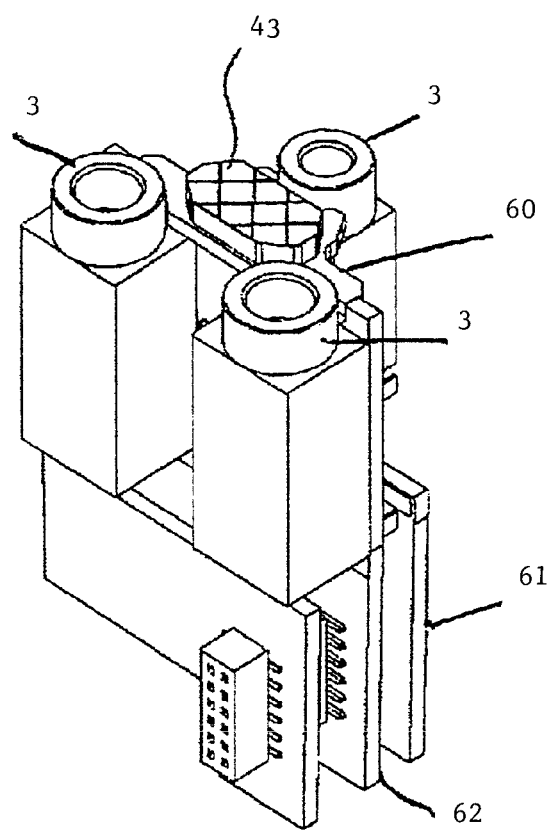

FIGS. 21 and 22 show an arrangement of printed circuit boards 60, 61 and 62 which may be used with an embodiment such as that of FIG. 20. Circuit board 60 has a conductor layer that provides the group 43 of conductor contacts and is machined so that the group 43 protrudes from the remainder of the board. In this way, the housing can be located about the board 60 so that the group 43 is substantially flush with face 4 upon assembly. Board 60 also facilitates location of boards 61 and 62 which carry plug pin receivers 3.

The examples described above may be used in conjunction with an in-flight entertainment system the socket being provided in or adjacent to a passenger seat, and the plug being provided on a headset. The socket is intended to have a very long service life. Spring contacts which may be used with magnetic jacks by contrast have a limited lifetime. The plugs are part of headphones which are viewed by airline operators as a consumable device. Therefore where spring contacts are used they can be located on the plug to maximise the lifetime of the conductive surface of the socket.

Those skilled in the art will appreciate that the construction shown has the advantage that multiple contact areas are provided using the layer structure disclosed, so that maximum use is made of the available space and therefore the overall size of the connector and plug arrangement can be kept to a minimum. The magnetic connection is advantageously achieved a magnetic means provided rearwardly of the connector regions i.e. the connector regions in use become between the magnetic means provided in the socket and the plug. Furthermore, those skilled in the art will appreciate that the socket is provided which may still be used with "legacy" plug arrangements. Therefore, the socket supports a new magnetic plug, but also has the advantage it is functional with existing pin type plug constructions.

What is claimed is:

1. An electrical connector socket for alternatively electrical connecting with a first plug and a second plug, the first and second plugs having different conductor configurations, the electrical connector socket comprising:
   a housing having a front face,
   a plurality of conductor contact regions provided on the front face to physically and electrically contact conductors of the first plug in use, the conductor contact regions being formed from a layer of conductive material and being adjacent to each other and in the same plane;
   a magnet provided in the housing to physically retain the first plug in connection with the socket in use; and
   a plug pin receiver comprising an aperture extending rearwardly of the front face and being adapted to axially receive a plug pin of the second plug.

2. An electrical connector socket as claimed in claim 1 wherein the conductor contact regions are substantially flush with the front face.

3. An electrical connector socket as claimed in claim 1 wherein one or more of the conductor contact regions is a power contact region operable to make a power supply available to the first plug.

4. An electrical connector socket as claimed in claim 3 wherein the power contact region is operated to make power available to the first plug once the first plug has been connected to the socket.

5. An electrical connector socket as claimed in claim 1 wherein the conductor contact regions are provided in three rows.

6. An electrical connector socket as claimed in claim 5 wherein the rows are parallel with each other, the contact regions in the first and third rows are substantially aligned and the contact regions of the second row are offset with respect to those of the first and third rows.

7. An electrical connector as claimed in claim 1 comprising a plurality of plug pin receivers and wherein the plug pin receivers are provided peripherally of the conductor contact regions.

8. An electrical connector as claimed in claim 1 wherein the plug pin receiver comprises an audio jack.

9. An electrical connector as claimed in claim 1 comprising a plurality of plug pin receivers for axially receiving the second plug.

10. An electrical connector as claimed in claim 9 wherein the plug pin receivers comprise a noise cancelling headphone jack.

11. An electrical connector socket as claimed in claim 1 wherein the housing comprises an alignment contour to co-act with a contour of the first plug to facilitate correct alignment of the first plug with the socket.

* * * * *